(12) United States Patent
Sebelius et al.

(10) Patent No.: US 8,814,439 B2
(45) Date of Patent: Aug. 26, 2014

(54) BEARING ASSEMBLY, CLUTCH ASSEMBLY AND CONSTANT VELOCITY TRANSMISSION

(76) Inventors: David P. Sebelius, Leeds, ND (US); Michael F. Marvonek, Stafford Springs, CT (US)

( * ) Notice: Subject to any disclaimer, the term of this patent is extended or adjusted under 35 U.S.C. 154(b) by 492 days.

(21) Appl. No.: 12/915,421

(22) Filed: Oct. 29, 2010

(65) Prior Publication Data

US 2012/0108375 A1 May 3, 2012

(51) Int. Cl.
*F16H 55/56* (2006.01)
*F16C 13/02* (2006.01)
*F16H 57/02* (2012.01)
*F16H 63/06* (2006.01)
*F16C 29/04* (2006.01)

(52) U.S. Cl.
CPC .............. *F16H 55/56* (2013.01); *F16H 63/067* (2013.01); *F16C 29/045* (2013.01)
USPC ......................................................... 384/586

(58) Field of Classification Search
USPC .............. 384/57, 58, 255, 447, 449, 586–588
See application file for complete search history.

(56) References Cited

U.S. PATENT DOCUMENTS

| | | | | |
|---|---|---|---|---|
| 2,915,346 | A | * | 12/1959 | Stallman ........................ 384/588 |
| 3,661,431 | A | * | 5/1972 | Wisecarver ..................... 384/55 |
| 2002/0097926 | A1 | * | 7/2002 | Mochizuki ...................... 384/58 |
| 2002/0110297 | A1 | * | 8/2002 | Saji ................................. 384/520 |

* cited by examiner

*Primary Examiner* — Alan B Waits
*Assistant Examiner* — Brian McGovern
(74) *Attorney, Agent, or Firm* — Robert S. Smith

(57) ABSTRACT

A bearing for engaging an associated shaft and an associated body for axial movement on the associated shaft which includes a housing; a first set of a plurality of mounting shafts carried by said housing, each mounting shaft in said first set of a plurality of mounting shafts having a center line; and a first set of a plurality of rollers, each roller being carried a respective one of said plurality of mounting shafts and mounted for rotation about the centerline of the respective mounting shaft, each roller being dimensioned and configured for abutting relationship with the associated shaft.

3 Claims, 9 Drawing Sheets

BEARING ASSEMBLY, CLUTCH ASSEMBLY AND CONSTANT VELOCITY TRANSMISSION

FIELD OF THE INVENTION

The invention has particular application to methods and apparatus for constant velocity transmissions (CVT), including clutch assemblies for such transmissions as well as bearings for mounting elongated shafts for axial moment. While the description will refer to apparatus used in recreational vehicles such as snowmobiles and all terrain vehicles, those skilled in the art will recognize the usefulness of the technology to a wide variety of other apparatus. For example, such apparatus may be used to operate the fan that increases the flow of air through a radiator on a large truck. In addition, automobiles also use constant velocity transmissions that, for example, utilize an electronically controlled, hydraulically operated pair of adjustable pulleys and a link chain that runs between them.

The prior art includes continuously variable transmissions (CVT) that may also be referred to as variable transfer drive assemblies. The fundamental design of the CVT utilizes a continuous belt having a V-shaped cross section. The belt engages conical friction surfaces of opposing pulley sheaves. The continuously variable feature of the CVT is accomplished by changing the distance between the sheaves of a particular pulley. As the sheaves are moved apart, the V-shaped belt moves radially inward to a lower radius of rotation or pitch. As the sheaves are moved together, the conical surfaces push the V-shaped belt radially outward so that the belt is riding at a larger diameter. The typical CVT is also sometimes referred to as an infinitely variable transmission in that the V-belt can be situated at an infinite range of radii depending upon the distance between the conical pulley sheaves.

In a typical embodiment of a constant velocity transmission (CVT) a drive pulley is provided as for operative connection to an engine crankshaft. An inner half or sheave of the pulley is carried on a sliding sleeve disposed on a shaft and has a belt engagement surface associated therewith adapted to engage a first side of a belt. An outer half or sheave of the pulley has a belt engagement surface associated therewith adapted to engage a second side of a belt. The mounting of the sliding sleeve is critical. More particularly, tolerances in the manufacturing process (inherent in all mass production) will lead to imprecise alignment of the inner sheave with respect to the outer sheave. Imprecise alignment will lead to pinching of the belt in many cases. Pinching of the belt has a very substantial impact on the performance of a recreational vehicle. Because recreational vehicles are used in competitive sports this is a matter of concern.

The mounting of the sliding sleeve is aggravated by the extreme temperature range that may be encountered by the apparatus. For example, a snowmobile may be stored within a building it at 70° F. and be moved outside for use at temperatures such as −50° F. The temperature range is particularly significant because the mounting may utilize a steel shaft with an aluminum sheave. Thus, (1) the difference between the respective coefficients of thermal expansion (2) combined with a potentially huge temperature differential in addition to (3) manufacturing tolerances that are inherent in every mass production system substantially complicate providing maximum performance from the constant velocity transmission and any vehicle that the transmission is a part thereof.

BACKGROUND OF THE INVENTION

The prior art includes CVT assemblies that include three basic components of the clutch system—the primary or primary engine or drive pulley, the secondary or driven pulley and the belt. In operation the belt must slip compliantly and transmit full engine power with virtually no slippage from the primary pulley to the secondary pulley in respective operating modes. Unlike an automotive transmission system, the belt and pulley mechanism on a snowmobile or other CVT serves as both the clutch and the gear system. In making the transition from a starting gear ratio to the final "top gear," the snowmobile uses two belt pulleys which have the ability to open and close axially (sideways) so that a specially designed belt can ride in various positions in each pulley. A representation of such an assembly is shown in FIG. 2.

The primary or drive pulley has a spring pressure that holds the pulley halves or sheaves apart when the engine rpm is low to facilitate de-clutching. As rpm increases, the centrifugal forces created by clutch weights overcome the spring pressure and close the pulley sufficiently to engage the belt and start transmitting power. The squeezing force created by the clutch weights continues to increase as the engine rpm increases. Assuming the sled is properly geared and has sufficient horsepower, the transition from low range to high range will continue until top speed is obtained. Various springs with different rates and lengths determine the pretension and can be used to change the engagement RPM and "refine" the shifting characteristics. The higher the spring pretension, the higher the engagement speed.

The clutch weights are the speed-sensing component of the primary pulley. As the engine rpm increases, the clutch weights swing out against the rollers in the spider tower, generating a force that quickly overcomes the spring pretension. As the engine speed increases, the clutch weights and their geometric relationship with the spider tower provide sufficient squeezing force to allow even the extreme horsepower of the "hyper sleds" to be transmitted with very minimal slip. It is estimated that the squeezing forces on the belt for the hyper sleds are in excess of 2000 lbs.

The design of the clutch weight shape and its geometric relationship with the spider is extremely complex. The shape or profile of the flyweight roller contact surface can modify the belt engagement speed and determines the unique shift curve required for each combination of engine, sled, and riding condition. Greater flyweights weight results in higher squeezing force and higher horsepower capability.

The secondary pulley also contains a spring, but unlike the primary pulley spring, it does not directly contribute to squeezing force. It functions in torsion (or twist) which assists the operation of the torque-sensitive cams. The twist creates some preload on the belt through the cam system and is quite important in controlling the back-shifting of the system when the throttle is released. Various springs are available for tuning purposes. The spring torque can be adjusted by placing the spring end in different adjustment holes in the pulley. In the secondary pulley, the torque sensitive cams are the heart of the feedback system. All of the transmitted power is fed through these cams.

SUMMARY OF THE INVENTION

It is an object of the present invention to provide a superior bearing assembly that will maintain alignment.

Another object of the present invention is to provide an assembly that will provide superior alignment of the movable sheave in a CVT.

Still another object of the invention is to provide an assembly that is suitable for mass production.

It has now been found that these and other objects of the present invention may be attained in a bearing for engaging an associated shaft and an associated body for axial movement on the associated shaft which includes a housing; a first set of a plurality of mounting shafts carried by said housing, each mounting shaft in said first set of a plurality of mounting shafts having a center line; and a first set of a plurality of rollers, each roller being carried a respective one of said plurality of mounting shafts and mounted for rotation about the centerline of the respective mounting shaft, each roller being dimensioned and configured for abutting relationship with the associated shaft.

Other forms of the present invention include a bearing for engaging an associated shaft and an associated body for axial movement on the associated shaft which includes a housing; a first set of a plurality of mounting shafts carried by the housing, each mounting shaft in the first set of a plurality of mounting shafts having a centerline and the centerlines of each mounting shaft in the first set of a plurality of mounting shafts being coplanar and disposed in a first plane, each centerline being disposed in aligned relationship with chords of a virtual circle that is concentric with the associated shaft; and a second set of a plurality of rollers, each roller being carried a respective one of the plurality of mounting shafts and mounted for rotation about the centerline of the respective mounting shaft, each roller being dimensioned and configured for abutting relationship with the associated shaft.

In some forms of the present invention the plurality of mounting shafts and the plurality of rollers is three mounting shafts and three rollers. Other forms of the present invention the plurality of mounting shafts in the plurality of rollers is four mounting shafts and four rollers. Some embodiments of the present invention have the rollers and the mounting shafts in the first set uniformly spaced in the housing whereby the rollers and the mounting shafts are uniformly spaced around the circumference of the associated shaft in operation.

Other embodiments of the present invention further include a second set of a plurality of mounting shafts carried by the housing, each mounting shaft in the first set of a plurality of mounting shafts having a centerline and the centerlines of each mounting shaft in the second set of a plurality of mounting shafts being coplanar and disposed in a second plane, each centerline being disposed in aligned relationship with chords of a virtual circle that is concentric with the associated shaft; and a second set of a plurality of rollers, each roller being carried a respective one of the second set of a plurality of mounting shafts and mounted for rotation about the centerline of the respective mounting shaft, each roller being dimensioned and configured for abutting relationship with the associated shaft; and the first and second planes are parallel and spaced apart.

The bearing may have the same number of rollers in the first set of a plurality of rollers and the second set of a plurality of rollers. The first and second sets of rollers may be out of phase by an angle measured in degrees that is equal to 360 divided by the number of mounting shafts in either the first or second set of a plurality of mounting shafts whereby each roller in both the first and second sets of eight are out of rollers is substantially uniformly disposed about circumference of the associated shaft.

The bearing may be part of a cover for a CVT assembly that is part of a CVT having a shaft anybody carried for axial movement on the shaft the body being carried the bearing in accordance with the present invention.

BRIEF DESCRIPTION OF THE DRAWING

The invention will be better understood by reference to the accompanying drawing in which:

FIG. 18 FIG. 7 is a more detailed rear view of a second bearing assembly that includes 3 rollers carried on respective shafts that are disposed as chords of a circle having a center coincident with the centerline of the bearing assembly.

DESCRIPTION OF THE PREFERRED EMBODIMENTS

Figure 1:
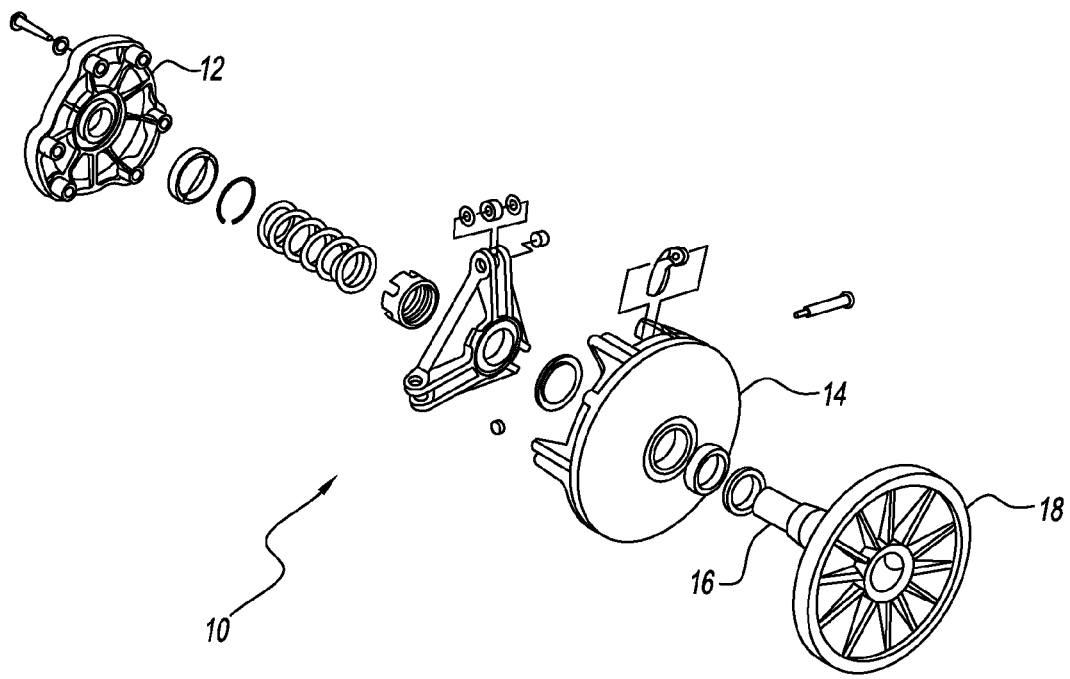
FIG. 1 is an exploded view of a prior art drive clutch assembly.
Figure 2A:
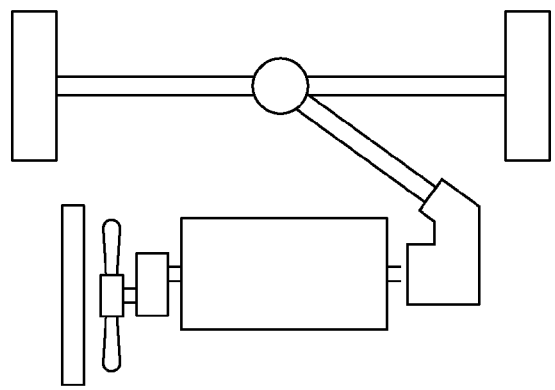
FIG. 2A is a diagrammatic view of a prior art vehicle having an engine, transmission and cooling system in which the CVT drives an accessory device such as a fan to increase the flow of air over an engine coolant radiator.
Figure 2:
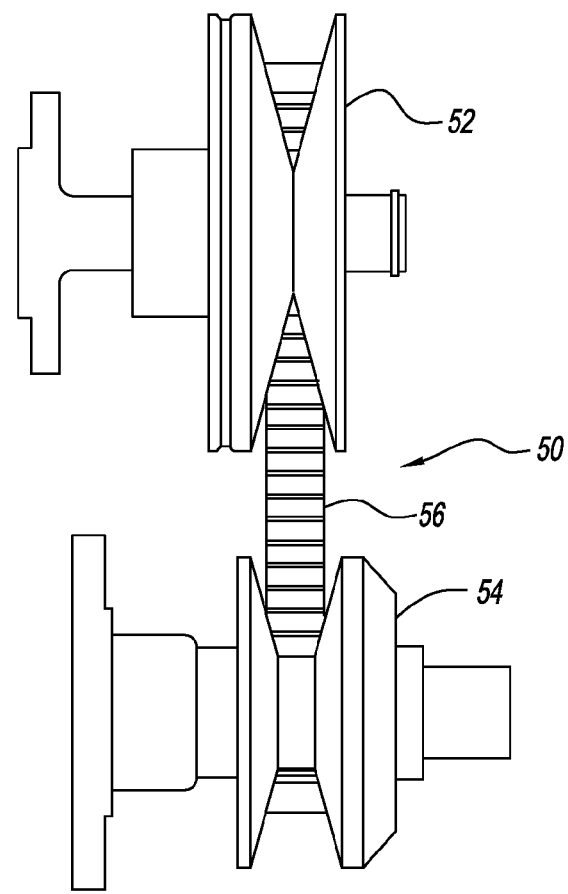
FIG. 2 is a diagrammatic view of a prior art constant velocity transmission showing a drive member assembly and a driven member assembly coupled by a belt.

Referring now to the drawing, FIG. 1 an exploded view of a prior art drive clutch assembly 10 and FIG. 2 is a diagrammatic view of a prior art constant velocity transmission 50 showing a drive member assembly 52 and a driven member assembly 54 coupled by a belt 56. The bearing assembly in accordance with one form of the present invention has particular application to such drive and driven member assemblies.

For the purposes of description the part of the bearing assembly to the left in FIG. 1 is referred to as the outboard side and the other side is the inboard side. As shown in FIG. 1 the sub-assembly from the cover 12 to the moveable sheave 14 moves axially with respect to a shaft 16 that is fixed to the fixed sheave 18. This axial movement is the movement that varies the spacing between the fixed sheave 18 and moveable sheave 14 in the normal operation of the constant velocity transmission shown in FIG. 2. The constant velocity transmission shown in FIG. 2 uses both a drive and a driven clutch. The bearing assembly in accordance with the present invention may be used for carrying the movable sheave in either the drive and driven clutch or both the drive and driven clutch. The description that follows refers to the bearing assembly that is part of the drive clutch. Those skilled in the art will recognize the significance of the present invention with respect to either the drive or driven clutch as well as to both drive and driven clutches.

Figure 3:
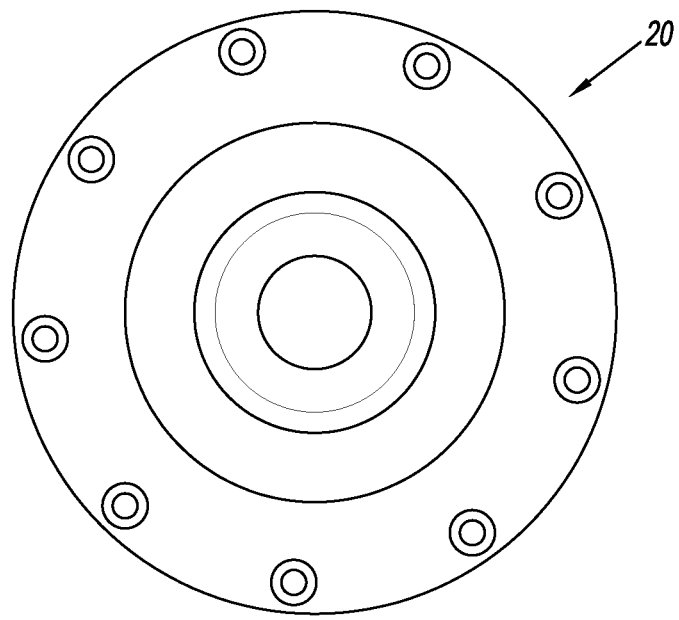
FIG. 3 is a front view of a cover that incorporates a bearing assembly in accordance one form of the present invention.
Figure 4:
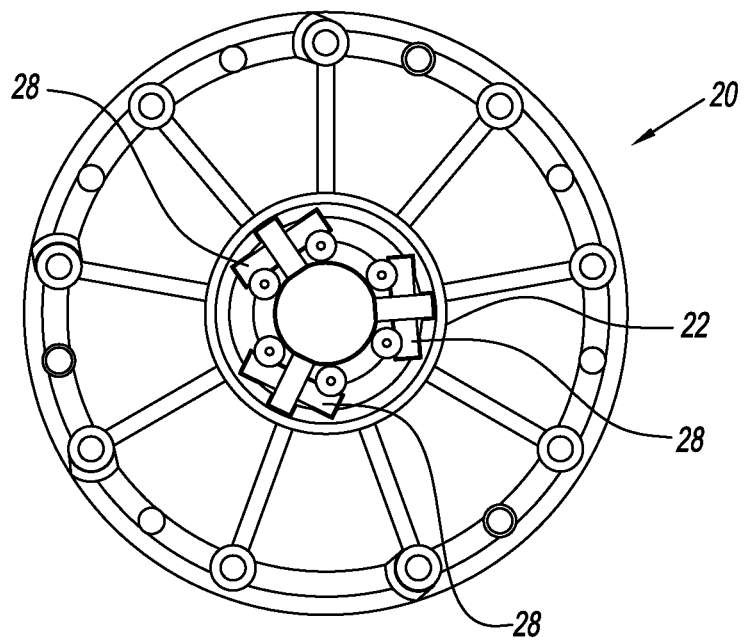
FIG. 4 is a rear view of the cover shown in FIG. 3.
Figure 5:
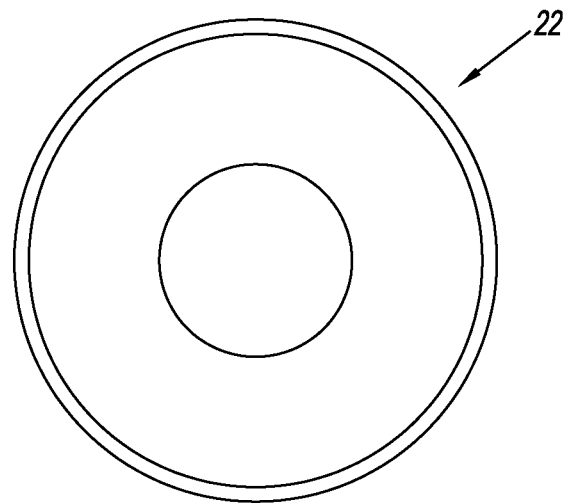
FIG. 5 is a more detailed front view of the bearing assembly shown in FIG. 3.
Figure 6:
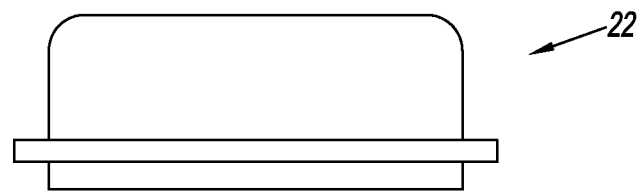
FIG. 6 is a more detailed side view of the bearing assembly shown in FIG. 3.

FIGS. 3 and 4 illustrate respectively front and rear views of a cover assembly 20 that incorporates a bearing assembly 22 in accordance one form of the present invention. Various embodiments of the cover assembly 20 are dimensioned and configured to replace a typical cover 12 shown in FIG. 1. The bearing assembly 22 is shown in greater detail in FIGS. 5, 6 and 7.

Figure 7:
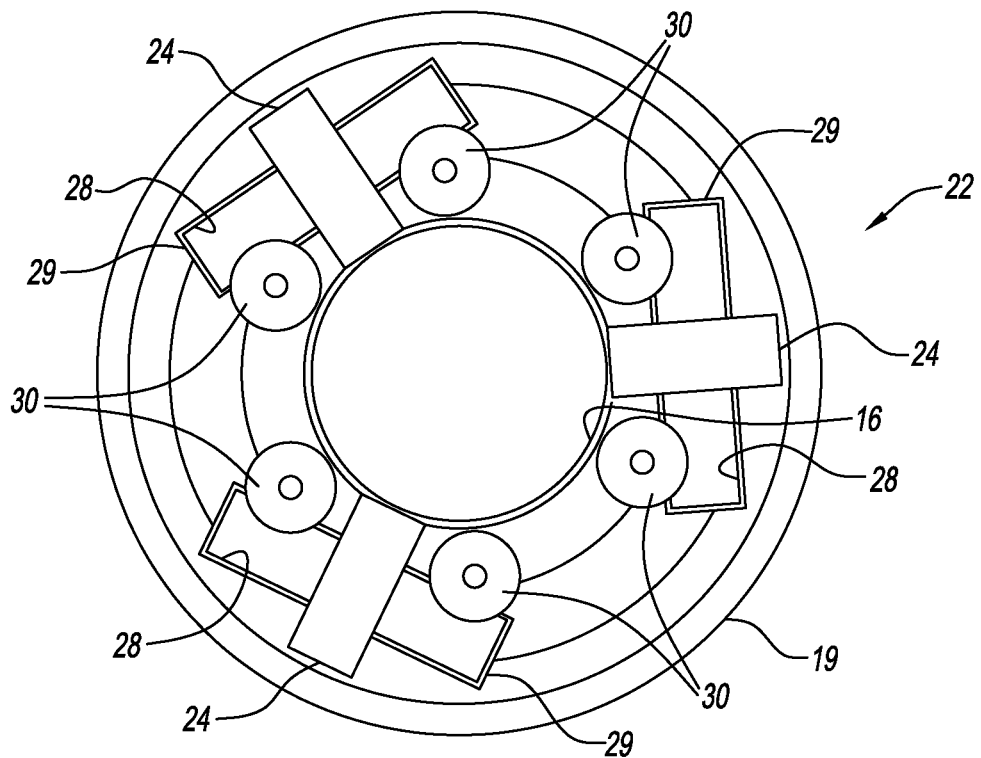
FIG. 7 is a more detailed rear view of the bearing assembly shown in FIG. 3 illustrating 3 rollers carried on respective shafts that are disposed as chords of a circle having a center coincident with the centerline of the bearing assembly.
Figure 8:
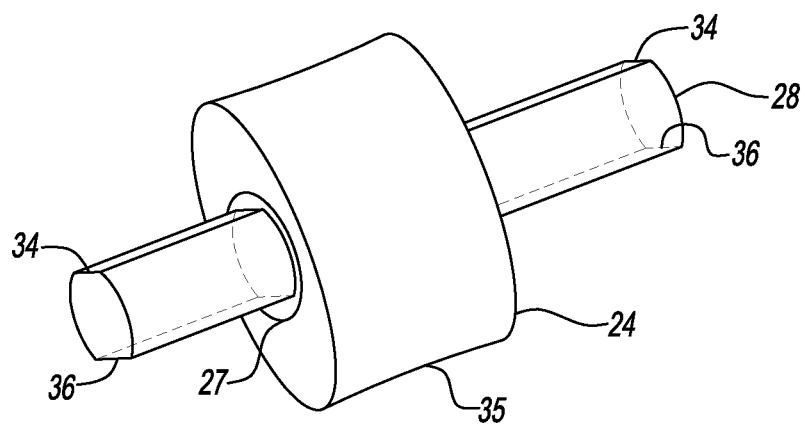
FIG. 8 is an exploded view of the bearing assembly shown in FIG. 7
Figure 9:
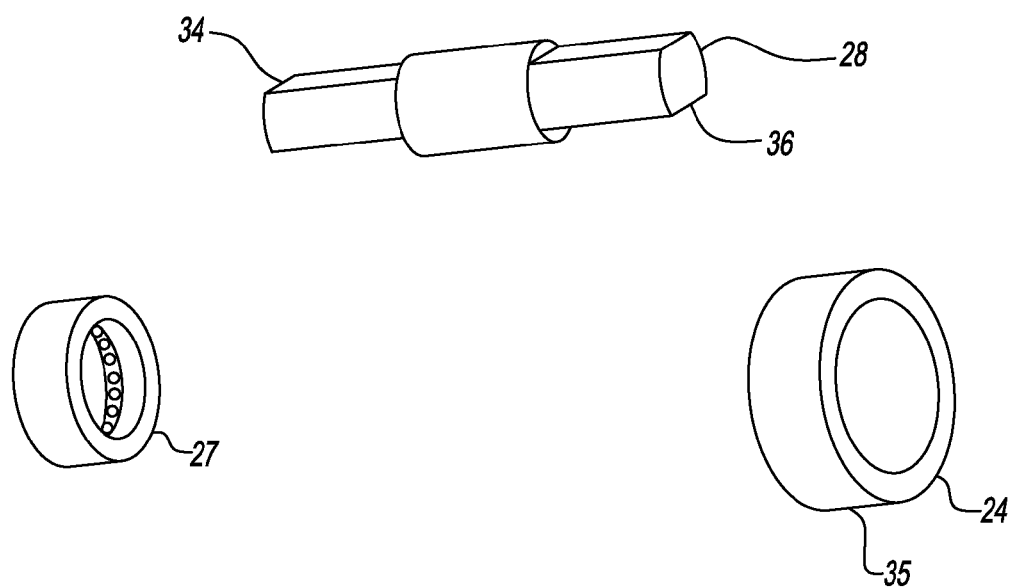
FIG. 9 is a perspective view of a sleeve bearing disposed in the inboard axial part of the bearing assembly to avoid metal to metal contact when the movable sheave is fully extended away from the fixed sheave.

The illustrated embodiment of the bearing assembly in accordance with the present invention illustrated in FIG. 7 shows three rollers 24 carried within a housing. Each roller 24 is carried on a respective needle bearing 27 mounted on a respective shaft 28. Each shaft 28 is disposed within one of three slots 29 in the housing 19. Each shaft is positioned in aligned relationship to a chord of a virtual circle having a center coincident with the centerline of the bearing assembly. The shafts have respective first and second flat planar surfaces 34, 36 on opposed sides of the axial extremities of each shaft. The flats are asymmetrically positioned with respect to the centerline of the shaft 28. Thus, the first flat planar surface 34 is disposed on one side of the shaft and is parallel to the axis of the centerline of the shaft and disposed a distance X from the centerline. (The precise dimension of X will vary with the specific application.) The second flat planar surface 34 is disposed on an opposed side of the shaft 28 and is parallel to the axis of the centerline of the shaft and disposed a distance that is less than X from the centerline of the shaft 28. Accordingly, the first and second flat surfaces 34, 36 are parallel and are dimensioned and configured to slide into respective slots 29 in the housing 19. The asymmetry of the flat surfaces allows the assembler to make minor adjustments to the fit between the respective rollers 24 and the shaft 16. The heads of respective flathead screws overlap and secure each axial extremity of each mounting shaft 28 within a slot 29. (The representation of the flat planar surfaces 34, 36 in the drawing will be understood to be somewhat exaggerated in the drawing for the purpose of better understanding an embodiment of the present invention.)

The asymmetric placement of the flat planar surfaces 34, 36 on the axial extremities of the mounting shaft 28 enables the user to vary the position of the roller 24 with respect to the shaft 16 carried by the bearing assembly. More specifically, because the flats are asymmetric, it is possible for the user to remove a mounting shaft 28 from a slot 29, rotate the mounting shaft 180 degrees and reinsert the mounting shaft 28 into the slot 29 and thus change the position of the roller 24 with respect to the shaft 16. Accordingly, for racing events or other particular situations the user merely removes the two flat head screws 30 that hold each of the mounting shafts 28 and rotate that shaft. In some situations, only one shaft 28 will be rotated, in others situations two or three shafts 28 may be rotated to change the adjustment a shaft 16 and respective rollers 24.

The preferred embodiment described above and illustrated in FIG. 7 utilizes three mounting shafts 28 each carrying a needle bearing 27 that carries a metal, plastic, or rubber roller 24 that has a arcuate concave face for engaging a cylindrical shaft. In that embodiment all of the mounting shafts 28 have centerlines that are coplanar. In some embodiments the roller will be manufactured from a plastic or rubber material although other materials may be used in others. Teflon® or phenolic materials are used in various embodiments.

Figure 10:
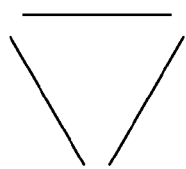
FIG. 10 is a diagrammatic view representing the placement of the centerlines in a first bearing assembly having three roller shafts in a single first plane as shown in FIG. 7.
Figure 11:
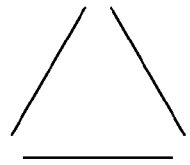
FIG. 11 is a diagrammatic view representing the placement of the centerlines of a second bearing assembly having three roller shafts in a single second plane as shown in FIG. 18.
Figure 17:
FIG. 17 shows a roller face having intersecting planes that is utilized in other embodiments.
Figure 18:
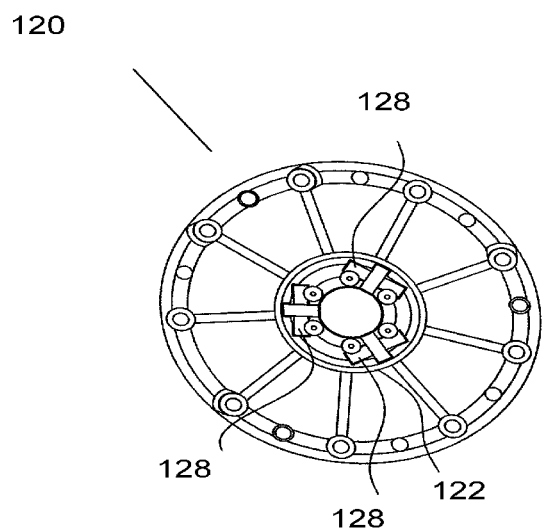
Figure 19:
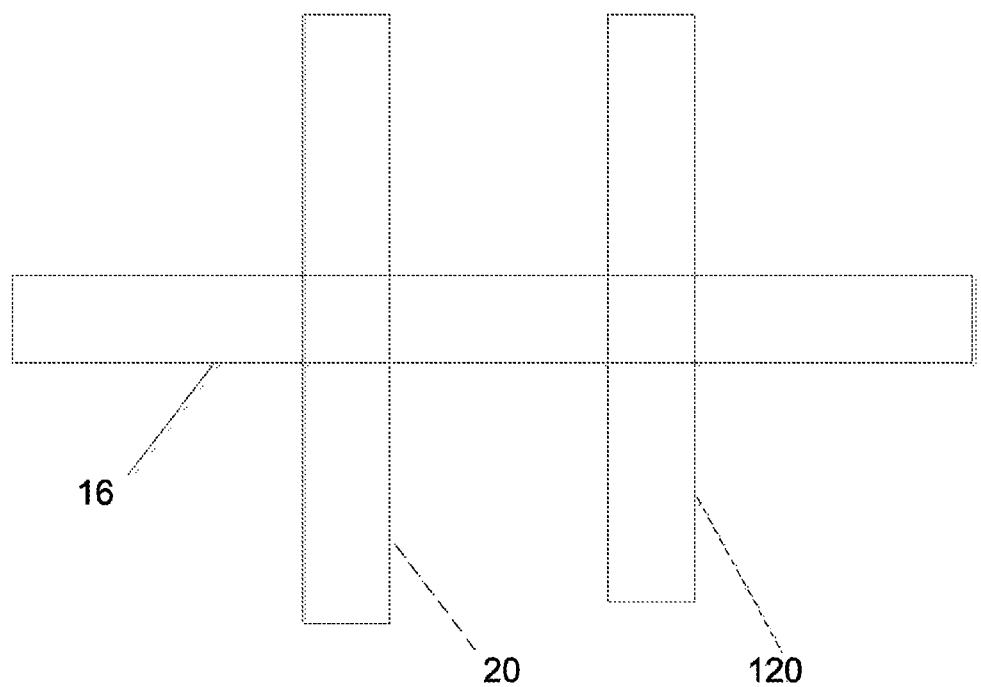
FIG. 19 is a schematic view illustrating the shaft 16 supported at respective axial points by the cover 20 and the bearing assembly thereof as shown in FIG. 3 and the bearing assembly 120 shown in FIG. 18.

Other embodiments may use two sets of three roller shafts 28 each carrying a needle bearing 27 that carries a roller 24. The respective sets are axially spaced for engaging axially spaced parts of the shaft 16 fixed to the fixed sheave 18. FIG. 18 illustrates such a bearing assembly 120 substantially similar to the structure shown in FIG. 4. The respective elements 22, 28 in FIG. 4 correspond to the elements 122 and 128 in FIG. 17. More specifically, as show diagrammatically in FIG. 10 the diagrammatic view represents the placement of the centerlines of three mounting shafts 28 in a single first plane. FIG. 11 is a diagrammatic view representing the placement of the centerlines of three additional mounting shafts in a single second plane. It will be understood that the first and second planes are closely spaced. The diagrammatic representation shows that the rollers 28 in the second plane are out of phase (in other words—indexed) with respect to the rollers 28 in the first plane. Thus, in the diagrammatic representation of the bearing having three rollers in a first plane and three rollers in a second plane, there will be six rollers uniformly spaced about circumference of the shaft 16 that is being carried by the bearing assembly 22. In one form the flat head screws 30 that hold the mounting shafts 28 in the first set of mounting shafts 28 may be replaced by flat head screws with respective threaded nuts and screws. Thus, the two screw and nut assemblies that hold the adjacent ends of two different shafts having their shafts in the first plane will hold the axial extremities of a single shaft having the centerline in the second plane.

Still other embodiments may utilize 2, 4, 5 or more rollers carried on respective shafts having the centerlines of the respective mounting shafts coplanar in a single set. Some of these embodiments may have one or more additional sets of rollers having respective mounting shafts coplanar in the additional set. The rollers in all of the sets may be uniformly spaced about the shaft. Thus, if there are four rollers in a first set uniformly spaced about the shaft and four rollers in a second set uniformly spaced about the shaft and out of phase with respect to the first set, the assembly will in some embodiments have a total of eight rollers uniformly spaced around the shaft. Typically, increasing the number of rollers will necessitate decreasing the length of the mounting shafts because of space limitations.

Some embodiments of the present invention may utilize a housing having a bore extending through having an axis and slots in the housing receive the mounting shafts adjacent to one axial extremity of the housing. Other embodiments may have additional slots for receiving additional mounting shafts at the other axial extremity of the housing to achieve a structure having rollers disposed at axially spaced points along the associated shaft. Still other embodiments may not have a uniform slot depth at one axial extremity of the housing so that the rollers will not contact the associated shaft at the same axial position.

Although the preceding discussion relies on a description of respective sets of rollers having rollers carried on respective shafts having the axes thereof disposed in coplanar relationship still other embodiments may have a different geometric relationship. More specifically, one example is a representative embodiment still having first and second sets of rollers disposed at axially spaced parts of the shaft, however, the axes of the shafts mounting the rollers are not coplanar. For example, in an embodiment with four rollers in each set the axes of the shafts supporting two opposed rollers may be different from the axes of the two other opposed rollers. An advantage of such an embodiment is that additional space is available. Such an embodiment will thus have (1) a first set of four rollers with two opposed rollers carried on respective shafts with axes in a first plane and two opposed rollers carried on respective shafts with axes in a second plane and (2) a second set of four rollers with two opposed rollers carried on respective shafts with axes in a third plane and two opposed rollers carried on respective shafts with axes in a fourth plane.

Figure 12:
FIG. 12 shows an alternate square cross-section of the shaft that may be carried by the bearing assembly in other embodiments.
Figure 13:
FIG. 13 shows an alternate rectangular cross-section of the shaft that may be carried by the bearing assembly in other embodiments.
Figure 14:
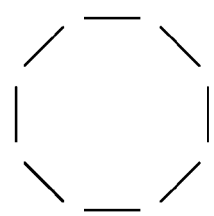
FIG. 14 shows an alternate octagonal cross-section of the shaft that may be carried by the bearing assembly in other embodiments.

The contour of the face of the roller (that contacts the face of the cylindrical shaft fixed to the fixed sheave) is arcuate and concave in the embodiments described above. This contour for the application described maximizes surface contact with the shaft fixed to the fixed sheave. The bearing assembly in accordance with the present invention has application to many other applications where a shaft or other elongated member slides with respect to a bearing. For example, the shaft that the bearing engages may have a cross section that may be a square, rectangle, or any regular or irregular polygon in various embodiments of the present invention. FIGS. 12-14 illustrate respectively square, rectangular and octagonal cross sections.

Figure 15:
FIG. 15 shows an arcuate and concave roller face that is utilized in the embodiment of FIG. 7.
Figure 16:
FIG. 16 shows an arcuate and convex roller face that is utilized in other embodiments.

The arcuate and concave roller face is illustrated in FIG. 15 illustrates the roller face that is utilized in the embodiment of FIG. 7. FIG. 16 shows an arcuate and convex roller face that is utilized in other embodiments. FIG. 17 shows a roller face having intersecting planes that is utilized in other embodiments such as those cooperating with square, rectangular and octagonal cross sections. The included angle between the intersecting planes will depend on the specific cross section of the shaft being supported. For example, the included angle may be 90 degrees for cooperation with a square shaft.

The description herein refers to rollers carried on needle bearings that are carried on mounting shafts that are disposed in slots in the housing. Thus, the roller moves with respect to the mounting shaft in normal operation. Other embodiments may have the roller fixed to the mounting shaft and rely on movement of the mounting shaft with respect to the housing. Such variations are included within the claims defining the present invention.

All publications and patent applications mentioned in this specification are indicative of the level of skill of those skilled in the art to which this invention pertains. All publications and patent applications are herein incorporated by reference to the same extent as if each individual publication or patent application was specifically and individually indicated to be incorporated by reference.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A bearing for supporting and maintaining alignment between an associated shaft having a centerline and an associated body for relative axial movement, the bearing comprises:
    a housing;
    a first plurality of mounting shafts carried by said housing, each mounting shaft in said first plurality of mounting shafts having a centerline, each centerline of each mounting shaft in said first plurality of mounting shafts being coplanar and disposed in a first plane, each centerline of each mounting shaft in said first plurality of mounting shafts being disposed in aligned relationship with a respective chord of a first virtual circle, the first virtual circle is concentric with the centerline of the associated shaft; and
    a first plurality of rollers, each roller in said first plurality of rollers being carried on a respective one of said first plurality of mounting shafts, each roller in said first plurality of rollers is mounted for rotation about the centerline of the respective one of said first plurality of mounting shafts, each roller in said first plurality of rollers being dimensioned and configured for abutting relationship with the associated shaft;
    a second plurality of mounting shafts carried by said housing, each mounting shaft in said second plurality of mounting shafts having a centerline, each centerline of each mounting shaft in the second plurality of mounting shafts being coplanar and disposed in a second plane, each centerline of each mounting shaft in said second plurality of mounting shafts being disposed in aligned relationship with a respective chord of a second virtual circle, the second virtual circle is concentric with the centerline of the associated shaft; and
    a second plurality of rollers, each roller in said second plurality of rollers being carried on a respective one of said second plurality of mounting shafts, each roller in said second plurality of rollers is mounted for rotation about the centerline of the respective one of said second plurality of mounting shafts, each roller in said second plurality of rollers being dimensioned and configured for abutting relationship with the associated shaft;
    said first and second planes being disposed in a spaced parallel relationship;
    wherein at least one of the first plurality of mounting shafts or the second plurality of mounting shafts has a first axial end and a corresponding second axial end, each of the first axial end and the corresponding second axial end has a first flat planar surface and a second flat planar surface, the first flat planar surface on the first axial end is substantially coplanar to the first flat planar surface on the corresponding second axial end, the second flat planar surface on the first axial end is substantially coplanar to the second flat planar surface on the corresponding second axial end, the first flat planar surface on the first axial end being substantially parallel to the second flat planar surface on the first axial end, each first flat planar surface and each second flat planar surface are dimensioned and configured for engagement with a respective slot in said housing, wherein each first flat planar surface is asymmetrically disposed relative to each second flat planar surface with respect to the centerline of the at least one of the first plurality of mounting shafts or the second plurality of mounting shafts.

2. A CVT having a stationary sheave and a movable sheave, said movable sheave being carried on the associated shaft supported for relative axial motion by the bearing as described in claim 1.

3. An apparatus for mounting an associated bearing that allows lateral position change of the associated bearing centerline which comprises:

a mounting shaft having a centerline, a first axial extremity, and a second axial extremity, said first and second axial extremities each having a first substantially planar side and a second substantially planar side, the first substantially planar side on said first axial extremity being substantially coplanar to the first substantially planar side on said second axial extremity, the second substantially planar side on said first axial extremity being substantially coplanar to the second substantially planar side on said second axial extremity, each first substantially planar side being substantially parallel to each second substantially planar side, each first and second substantially planar side being substantially parallel to said centerline, each first substantially planar side being disposed at a distance from said centerline that is different than a distance of each second substantially planar side from said centerline; and a housing having a slot for mounting said mounting shaft, the slot having a first substantially parallel side and a second substantially parallel side, the first and second substantially parallel sides are opposed and spaced apart a distance that is substantially equal to a distance of each first substantially planar side from each second substantially planar side, whereby a lateral position of the centerline of said mounting shaft and said slot is varied by selective assembly with either: (1) each first substantially planar side of said mounting shaft in face-to-face abutting relationship with said first substantially parallel side of said slot or (2) each second substantially planar side of said mounting shaft in face-to-face abutting relationship to said second substantially parallel side of said slot.

\* \* \* \* \*